Aug. 24, 1965 R. P. J. PINARD 3,202,350
DIGITAL PRINTING SYSTEM
Filed June 6, 1961
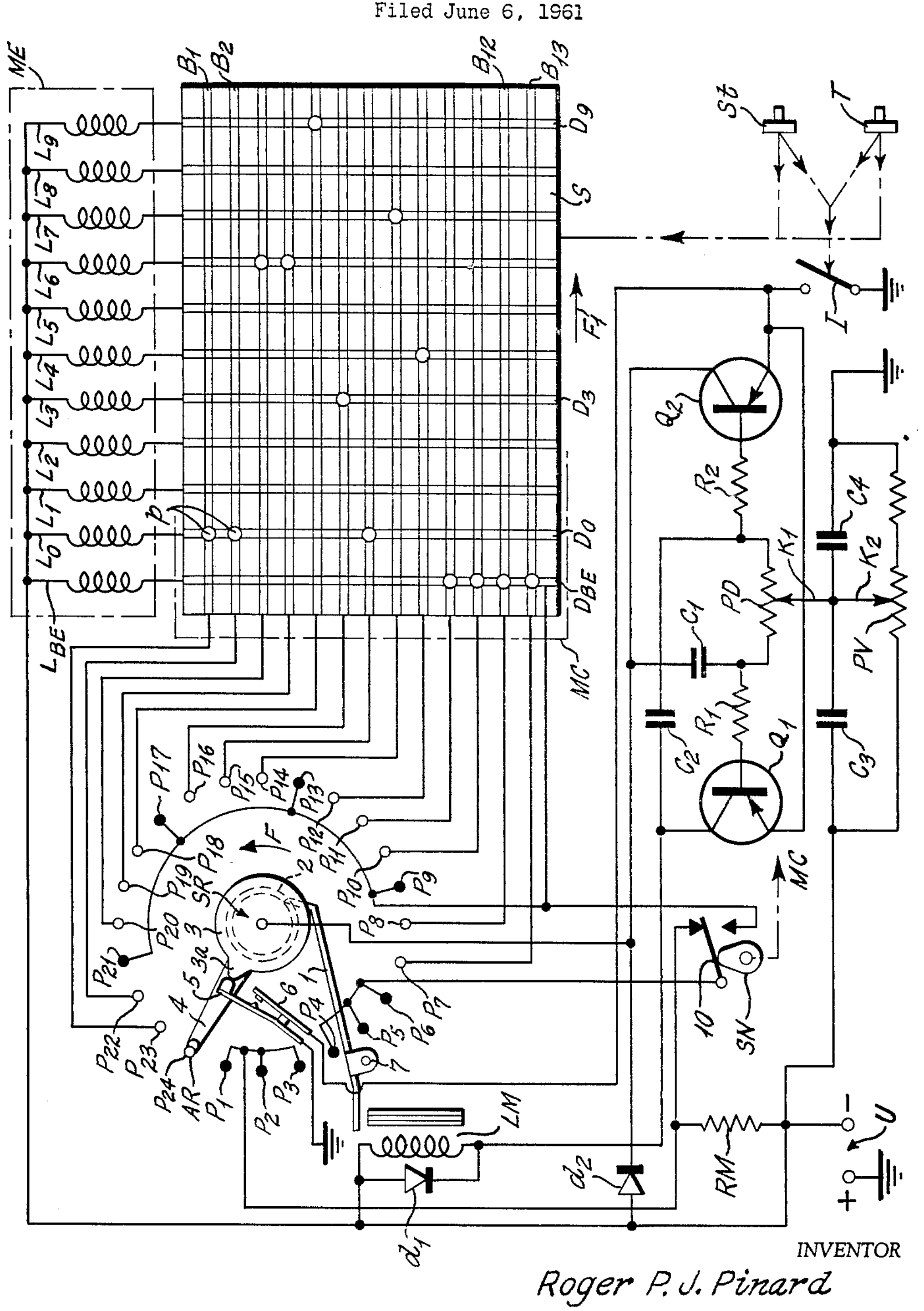
INVENTOR
Roger P. J. Pinard
BY
Stevens, Davis, Miller & Mosher
ATTORNEYS

United States Patent Office 3,202,350

Patented Aug. 24, 1965

3,202,350

DIGITAL PRINTING SYSTEM

Roger P. J. Pinard, Rueil, Seine et Oise, France, assignor to Societe de Mecanographie Japy, Paris, France, a French company Filed June 6, 1961, Ser. No. 115,237
Claims priority, application France, June 20, 1960, 830,578
12 Claims. (Cl. 235—59)

This invention relates to accounting machine systems, and is especially directed to improved means for printing out multidigit numbers stored in desk calculator and similar mechanisms.

One widely used form of accounting machine system includes a typewriter and desk calculator combination. In such a combination the digital character keys of the typewriter are coupled, mechanically or electrically, with the corresponding digital input keys of the calculator so that every time a typewriter key is depressed to print a digit on a sheet of paper carried by the typewriter, the corresponding digital value is entered into an input register of the calculator to be stored there. Conversely the digital keys of the typewriter can be arranged to be controllable (e.g. through solenoid relays) from the calculator so that on issuance of an "operate" command to the calculator, say by depression of a totalizer key in case of an adder machine, and after the calculator has thereupon operated to provide a multidigit reset amount, the calculator will then sequentially operate the keys of the typewriter to print out automatically said amount on the sheet of paper.

It is an object of this invention to provide improved digital print-out means especially applicable to such a calculator and typewriter combination for performing the automatic calculator-controlled print-out operation just indicated. It should be understood however that the invention may find application in connection with systems other than the calculator and typewriter combination referred to above, and it is a consequent broad object of this invention to provide an improved arrangement for printing out multidigit amounts stored in calculator mechanisms.

A more specific object is to provide an improved arrangement for causing a solenoid-operated printing mechanism to print out a multidigit amount stored in associated calculator mechanism, which will operate automatically to effect a stepping displacement of a scanning device or switch followed by the completion of circuit paths including the respective solenoids operating the digit printing keys of the printing mechanism, and thereafter will transmit an energizing voltage pulse over the completed circuit path to each solenoid in sequence to print a corresponding digit. One advantageous feature of this improved arrangement is that the energizing circuits for the respective printing solenoids are completed sequentially as they are required rather than being permanently established as in certain prior systems, whereby cut-off sparking is avoided at the stepper switch contacts and elsewhere and longer service life is imparted to the system. Other objects and advantages of the invention will appear as the disclosure proceeds.

The invention provides an arrangement for causing typewriting mechanism to print out a multidigit amount stored in an associated calculator mechanism, said typewriter mechanism including a plurality of digital type-printing keys and printing solenoids associated therewith and individually energizable to actuate the keys, and said calculator mechanism including digital members each settable to a plurality of digital settings to indicate a multidigit amount stored in the calculator mechanism, which arrangement comprises a selector matrix having a first set of electrically conductive elements connected to the respective printing solenoids and a second set of electrically conductive elements mechanically displaceable by the respective digital members and means for electrically interconnecting each second element with only that first element corresponding to the digital setting of said second element; a stepper switch comprising a displaceable switch arm and a series of switch contacts respectively connected to said second elements and sequentially engageable by said arm; a stepper electromagnet energizable for stepping said switch arm over the series of contacts; and a multivibrator circuit having a pair of outputs respectively connected to said electromagnet and said switch arm, said circuit when energized cyclically applying energizing voltage pulses of definite durations through its respective outputs to said electromagnet and switch arm whereby to step the switch arm over the series of contacts and energize the solenoids to print out sequentially the digits of a multidigit amount stored in the calculator mechanism.

An exemplary embodiment of the invention will now be described for purposes of illustration but not of limitation with reference to the accompanying diagrammatic drawing.

In the accompanying schematic drawing only the components directly relating to the invention have been illustrated. The broken-line frame MC functionally indicates a mechanical calculating machine and the frame ME similarly indicates a typewriter the numerical keys of which are to be automatically actuated by the system of the invention in accordance with successive digits of an amount stored in the calculator. Both the calculator and typewriter being of a generally conventional character shall not be described except for those parts thereof having a direct bearing on the invention.

The typewriter ME includes a set of solenoid windings excitation of which is operative through conventional means to depress the type keys. Thus there is shown a solenoid $L_{BE}$ associated with the space bar of the typewriter and ten digit printing solenoids $L_0$ through $L_9$ individually associated with the respective digital keys, it being understood that the excitation of any one of the digit printing solenoids will cause the typewriter to type the corresponding digit character on a sheet of paper held in the typewriter while excitation of spacer solenoid $L_{BE}$ will cause the sheet to be advanced by one character space in accordance with usual practice.

All the solenoids have their one ends connected in parallel to the negative terminal of a D.-C. voltage source U. The calculator includes a selector matrix element S comprising an array of eleven parallel equi-spaced bars $D_{BE}$ and $D_0$ through $D_9$ made of electrically conductive material and having their one ends respectively connected to the free ends of the corresponding typewriter solenoids $L_{BE}$ and $L_0$ through $L_9$ through any suitable plugging connector means not shown. While the calculator may be of any of various constructions it is here assumed for explanatory purposes to be of a well known type comprising a set of longitudinally shiftable rack members corresponding in number to the digital places the calculator is able to handle and each settable to one of ten longitudinally spaced positional settings respectively corresponding to the digits 0 to 9. The settable digital members, such as racks, of the calculator, are here assumed to be thirteen in number. The selector matrix S accordingly includes a parallel equispaced array of thirteen further conductive bars $B_1$ through $B_{13}$ positioned in a common general plane parallel to and spaced a small distance from the common general plane of the afore-mentioned D bars and with the B bars extending in directions normal to the direction of the D bars. The afore-mentioned settable digital members, e.g. racks, of the calculator have not been shown but it will be understood that their respective paths of displacement are coincident with the bars $B_1$ through $B_{13}$ and that said members are secured to the respective bars. Each digital member moreover carries an electric contact element *p* secured thereon, and the arrangement is such that for each digital setting of any one of the thirteen calculator digital members the contact *p* carried by it provides an electric bridging connection between the B-bar associated with said member and the D-bar associated with the digital value corresponding to the setting of the member. In the inactivated or idle setting of each digital rack member the contact element *p* carried by it is positioned to connect the associated B-bar with the space bar $D_{BE}$. Thus in the drawing, it being noted that the B-bars are numbered in the order of increasing digital significance, it will be seen that the amount set on the matrix by the calculator rack contacts *p* in the setting shown, is the number 4,703,966.00. In this example the four highest rack members associated with bars B10–B13 are all in their idle setting and in accordance with a conventional expedient in calculators of the type here contemplated all such higher-order digital rack numbers that do not contain any significant digit are caused to be blocked in their idle setting $D_{BE}$, while the first such member, counting down from $B_{13}$, to contain a significant digit other than zero unlatches the succeeding members to permit them to assume their proper digital positions from $D_0$ to $D_9$.

Conveniently, the two arrays of B-bars and D-bars comprising the selector matrix are provided on insulator plates and are preferably provided in the form of printed circuits.

The system further includes a rotary stepping switch or selector SR including a rotatable contact arm 4 cooperating with an equispaced circumferential array of fixed contacts shown twenty-four in number, $P_1$ through $P_{24}$. Of these thirteen are connected to the thirteen digital-place bars $B_1$ through $B_{13}$. Specifically in the illustrated example the calculator has a digital capacity of thirteen as stated above, and the thirteen digital places are separated by spaces into three three-digit sections and two two-digit sections respectively of higher and lower significance. Thus for example the largest amount printable would be printed thus: 99 999 999 999 99. Accordingly the contacts $P_9$, $P_{13}$, $P_{17}$ and $P_{21}$ are all interconnected together and to the space bar $D_{BE}$. Contacts $P_7$ and $P_8$ are connected to bars $B_{13}$ and 12 respectively; contacts $P_{10}$, $P_{11}$ and $P_{12}$ are connected to bars $B_{11}$, $B_{10}$ and $B_9$ respectively; contacts $P_{14}$, $P_{15}$ and $P_{16}$ to bars $B_8$, $B_7$ and $B_6$; contacts $P_{18}$, $P_{19}$ and $P_{20}$ to bars $B_5$, $B_4$ and $B_3$; and finally contacts $P_{22}$ and $P_{23}$ to bars $B_2$ and $B_1$. The twenty-fourth contact AR is a dead contact and indicates the "off" position. Contacts $P_1$ through $P_6$ are connected in a manner later described.

Rotation of selector switch arm 4 is effected from a stepping electromagnet LM through generally conventional stepping mechanism which includes a rocking armature or pawl member 1 pivoted at 7 to a fixed support and having one end positioned for attraction by the core of electromagnet LM while its opposite end engages a set of ratchet teeth 2 formed round the periphery of a hub member 3 of conductive material from which the switch arm 4 radially projects. Hub 3 is further formed with a camming nose 3*a* adapted when the switch arm is engaging the "off" contact AR (the postiion shown) to push a contact strip 5 out of engagement from the cooperating contact strip 6 for a purpose that will later appear. It will be understood that with the arrangement described the application of successive energizing pulses to the winding of electromagnetic LM will act through the pawl and ratchet mechanism shown to advance the switch arm 4 over the successive contacts $P_1$ through $P_{23}$ to AR in the direction indicated by arrow F.

For providing the energizing pulses the system includes a free-running multivibrator or flipflop circuit. While this may assume various conventional forms, it is here shown as a transistorized circuit including the two transistors $Q_1$ and $Q_2$ having their emitter electrodes connected in common, by way of a general cutoff switch I, to ground which constitutes the positive terminal of power source U. The collectors of the respective transistors $Q_1$ and $Q_2$ which constitute the output electrodes thereof are connected respectively to one end of electromagnet winding LM and to the selector switch arm 4 by way of hub 3. The bases of the transistors are connected through biassing resistors $R_1$ and $R_2$ to the opposite ends of a potentiometer resistor PD the slider $K_1$ of which is connected to the negative source terminal, as here shown by way of an auxiliary potentiometer PV. Moreover, the collector of each transistor $Q_1$ and $Q_2$ is cross-coupled through a capacitor $C_1$, $C_2$ to the base of the other (by way of the base biassing resistor $R_2$ or $R_1$) to provide for the desired astable or free-running multivibrator action in a conventional way. The adjustment of slider $K_1$ on potentiometer resistor PD adjusts the relative bias of the transistor bases which in turn determines the relative lengths of the periods in each operating cycle of the multivibrator during which the transistors conduct. Preferably the slider $K_1$ is positioned as shown closer to the potentiometer end connected to transistor $Q_1$ so as to provide a larger base bias and hence a longer conduction period for transistor $Q_1$ than for transistor $Q_2$. The reason for this is that it normally takes less time for a type lever to move from its idle to its printing position than the reverse. The total duration of the multivibrator cycle is adjusted by suitable selection or adjustment of the cross coupling capacitors $C_1$ and $C_2$. The proper cycle duration would in each case be predetermined with regard to the mechanical inertia of the calculator and typewriter components and other pertinent factors.

The biassing voltage present on the slider $K_1$ can be adjusted by adjustment of the auxiliary slider $K_A$ along voltage-dividing potentiometer PV. Shunt capacitors $C_3$ and $C_4$ connected between the sliders $K_1$–$K_2$ and the ends of the voltage divider serve to by-pass voltage transients occurring in the operation of the multivibrator. A diode $d_1$ shunting the electromagnet winding LM serves to protect the transistor $Q_1$ against excessive current surges in the electromagnet, and a diode $d_2$ shunting the parallel circuit of electromagnetic windings $L_{BE}$ and $L_0$ through $L_9$ performs a similar function in respect to transistor $Q_2$. Preferably all of the electromagnet windings $L_{BE}$ and $L_0$ through $L_9$ have equal ohmic resistances to equalize the output loads connected to the two transistors.

The cut-off switch is adapted to be closed on depression of either one of two keys of the calculator, namely a totalizer key T and a subtotalizer key S*t*, for reasons that will be later explained.

In the operation of the system, it can be assumed that the operator is seated at the keyboard of the typewriter and is typing one or more successive columns of numbers on a sheet of paper carried thereby. Each column may for example represent a separate account and the numbers in each column are to be added up at the bottom of the corresponding account. Due to a suitable and conventional coupling, not shown, between the respective digital keys of the typewriter and the calculator mechanism, the typing of each digit causes entry of the corresponding digital value into an input register of the calculator. On depression of a conventional transfer key, not shown, which may be provided on the typewriter or the calculator keyboard, or in some arrangements automatically on shifting of the typewriter carriage, each of the numbers present in the input register is transferred additively into the totalizer register of the calculator.

When it is desired to record a subtotal or total of a number of amounts in a given column, the operator actuates the tabulator of the typewriter to bring the carriage thereof into register with the column in which the total or subtotal is to be printed, and thereafter depresses either key T or key S*t* according as the total or subtotal is desired. Depression of the totalizer key T resets the totalizer register to zero whereas depression of subtotalizer key R*t* does not. Depression of either key S or S*t* initiates through conventional means not shown an operating cycle of the calculator which sets the digital members, e.g. racks, of the calculator to positions corresponding to the digits of the total or subtotal amount to be printed, as said amount is contained in the totalizer register.

Simultaneously the depression of key T or S*t* closes the control switch I of the system of the invention, thereby applying the positive source, i.e. ground potential, to the emitters of both transistors $Q_1$ and $Q_2$. However only the circuit through transistor $O_1$ is effectively completed since the collector of $Q_1$ is connected through stepping electromagnet winding LM to negative battery terminal whereas the collector of $Q_2$ is at this time disconnected from the negative terminal in view of the fact that stepping switch arm 4 to which said collector is connected is engaging idle contact AR.

A voltage pulse is thus applied through transistor $Q_1$ to electromagnet winding LM which attracts pawl lever 1 and causes the switch arm 4 to advance one step of rotation to engage contact $P_1$. Departure of switch arm 4 from the "off" position closes the contacts at 5–6 so that cut-off switch I is now shunted and key T or S*t* can be released without deenergizing the system. Engagement of switch arm 4 with contact $P_1$ connects the collector of transistor $Q_2$ with negative battery terminal by way of a circuit traceable from said collector through switch hub 3 and switch arm 4, contact $P_1$, and resistor RM to negative battery. Transistor $Q_2$ now conducts, and the consequent current flow reduces through cross-coupling condenser $C_1$ the bias potential applied to the base of $Q_1$ so that the latter transistor is cut off. Conducting transistor $Q_2$ applies a voltage pulse through arm 4 to contact $P_1$ without further mechanical result in the system. However, the pulse thus emitted is transmitted through cross-coupling condenser $C_1$ to the base of transistor $Q_1$ restoring the latter to conductive condition and cutting off transistor $Q_2$. Transistor $Q_1$ now emits another pulse to cause the stepper switch arm 4 to advance from contact $P_1$ to contact $P_2$ as earlier described.

The first three contacts $P_1$, $P_2$ and $P_3$ of the stepper switch serve no other purpose than that of allowing establishment of stable operating conditions in the system and enabling the digit members of the calculator to assume their final settings.

The above description of the operation of the multivibrator circuit will have made it clear that the collectors of the respective transistors $Q_1$ and $Q_2$ produce alternate voltage pulses of predetermined durations which are alternately applied to the stepper electromagnet LM and to the stepper arm 4, thus causing sequential advance of the stepper arm over the series of P-contacts. As the stepper arm engages contact $P_4$, there are two situations to be considered. In a normal condition, a cam SN of the calculator maintains a switch arm 10 in the upper position illustrated, where the three contacts $P_4$, $P_5$ and $P_6$ are all connected merely through resistors RM to negative terminal so that engagement of arm 4 with any one of these three contacts has no other effect beyond ensuring the performance of the normal multivibrator cycle and the advance of the stepper switch. However, cam SN is arranged to be mechanically actuated from the calculator mechanism whenever a negative balance amount is indicated by the totalizer, thereupon moving switch arm 10 to its lower position. This connects contacts $P_4$, $P_5$ and $P_6$ to spacer bar $D_{BE}$ of the selector matrix S so that engagement of the stepper arm with each of the three said contacts energizes the spacer solenoid LBE to cause the typewriter carriage to advance by one character space. The effect of this is, that in case of a negative balance the typewriter is advanced three spaces and the ensuing total is then typed in a different column assigned to negative balances.

Starting with the stepper arm 4 engaging contact $P_4$, the actual printing-out operations commence. As the stepper arm engages each one of the thirteen earlier-listed P-contacts that are respectively connected to the digital-order bars $B_{13}$ through $B_1$, the energizing voltage pulse is applied by way of the bridging contact *p* carried by said bar to the particular one of the ten digit printing solenoids $L_0$ through $L_9$ which corresponds to the digital setting of the B-bar under consideration, so that the requisite digit is printed on the sheet. It is noted however that in the numerical example here selected for illustration, since the highest significant digit of the amount only occurs at the fifth digital place, so that bridge contacts *p* on the four highest-order bars $B_{13}$ through $B_{10}$ are all engaging spacer bar DBE, engagement of stepper arm 4 with each of the four contacts $P_7$, $P_8$, $P_{10}$ and $P_{11}$ merely again results in shifting the typewriter carriage four digital spaces thereby avoiding the printing of meaningless zeros to the left of the highest significant digit of a number.

It is also noted that engagement of stepper arm 4 with each one of the four contacts $P_9$, $P_{13}$, $P_{17}$ and $P_{21}$, all connected to spacer bar DBE, results in a shift of the typewriter carriage to provide the desired grouping of the printed amount into two- and three-digit sections as previously described, for convenience in reading.

When stepper switch arm 4 reaches the "off" contact AR, camming nose 3*a* opens the contacts 5–6, cutting off the power from the multivibrator and the system is returned to its initial idle state.

If desired, a decimal point (and/or some other character) may be printed at a suitable location say just ahead of the last group of two digits (or elsewhere). To provide for this, it would be simply necessary to connect the P-contact corresponding to the selected decimal-point position, say contact $P_{21}$ in the case just considered, to an additional printing solenoid (not shown) associated with the period-key of the typewriter keyboard, instead of connecting said contact with the spacer bar $D_{BE}$ as here shown.

It will be understood that many modifications may be made in the details of the embodiment of the invention illustrated and described without exceeding the scope of the invention. Thus the matrix grid S can assume a variety of forms other than the straight rectangular form shown. One important modification in this connection occurs where the invention is applied to a calculator in which the digital members rather than being settable to their digital positions by parallel displacements, are arranged to be settable by rotation. In such case the most suitable shape for the selector matrix S would be that of a polar-coordinate reference frame, i.e. one of the two cooperating sets of bars, say the B-bars, would be provided in the form of concentric circular conductors, while the other set of bars would be angularly spaced radial bars rotatable with respect thereto, or vice versa.

As regards the multivibrator or flip-flop circuit this can be provided in any of the various types known for the purpose, not necessarily transistorized.

What I claim is:

1. In combination with calculator mechanism including digital members each settable to a plurality of digital settings to indicate a multidigit amount stored in the calculator and typewriter mechanism including a plurality of digital type-printing keys and printing solenoids associated with the respective keys and individually energizable to actuate said keys; a system for printing a multidigit amount stored in the calculator comprising a selector matrix having a first set of electrically conductive elements each connected to one of the respective printing solenoids and a second set of electrically conductive elements mechanically connected for displacement by the respective digital members and means for electrically interconnecting each second element with only that first element corresponding to the digital setting of said second element; a stepper switch independent from said mechanisms and comprising a displaceable switch arm and a series of switch contacts respectively connected to said second elements and sequentially engageable by said arm; a stepper electromagnet energizable for stepping said switch arm over the said series of contacts; and circuit means connected to said electromagnet and to said switch arm cyclically operative for applying energizing voltage pulses of predetermined duration to the magnet and arm alternately whereby to step the switch arm over the series of contacts and energize said solenoids to sequentially print the digits of a multidigit amount stored in the calculator.

2. In combination with calculator mechanism including digital members each settable to a plurality of digital settings to indicate a multidigit amount stored in the calculator and printing mechanism including a plurality of digital type-printing keys and printing solenoids associated with the respective keys and individually energizable to actuate said keys; a system for printing a multidigit amount stored in the calculator comprising a selector matrix having a first set of electrically conductive elements each connected to one of the respective printing solenoids and a second set of electrically conductive elements mechanically connected for displacement by the respective digital members and means for electrically interconnecting each second element with only that first element corresponding to the digital setting of said second element; a stepper switch independent from said mechanisms and comprising a displaceable switch arm and a series of switch contacts sequentially engageable by said arm; a stepper electromagnet energizable for stepping said switch arm over the series of contacts; and a multivibrator circuit having a pair of outputs respectively connected to said electromagnet and said switch arm including means to energize said multivibrator circuit for cyclically energizing alternate voltage pulses of definite durations through said respective outputs to said electromagnet and switch arm whereby to step the switch arm over the series of contacts and energize the solenoids to sequentially print the digits of a multidigit amount stored in the calculator.

3. The system claimed in claim 2, wherein the stepper electromagnet is substantially equal in resistive impedance to the resistive impedance of each of said solenoids.

4. The system claimed in claim 2, wherein the characteristics of the multivibrator circuit are so adjusted that the voltage pulses applied to the electromagnet are of longer duration than the voltage pulses applied to the switch arm.

5. The system claimed in claim 2, wherein the typewriter mechanism includes a spacer key and an associated spacer solenoid energizable to actuate said key, and the stepper switch includes switch contacts connected to the spacer solenoid.

6. The system claimed in claim 2, wherein the typewriter mechanism includes a spacer key and an associated spacer solenoid energizable to actuate said key, and the stepper switch includes switch contacts connected to the spacer solenoid interposed between predetermined ones of the switch contacts connected to said second elements whereby to cause a multidigit amount to be printed out in several distinct digital groups.

7. The system claimed in claim 2, wherein the typewriter mechanism includes a separating character printing key and associated printing solenoid and the stepper switch contacts include at least one switch contact connected to said last-named solenoid for printing separating characters between selected digits of a multidigit amount.

8. The system claimed in claim 2, wherein the stepper switch includes a number of "dead" initial switch contacts the engagement of which by the switch arm does not produce any mechanical action in the typewriter mechanism and further comprising a general cut-off switch closable for energizing the multivibrator circuit and at least a control key on the calculator mechanism for closing said cut-off switch.

9. The system claimed in claim 2, further comprising a general cut-off switch closable for energizing the multivibrator circuit, a control on the calculator mechanism actuable for closing said cut-off switch, a pair of hold contacts shunting said cut-off switch and means on the stepper switch for disengaging the hold contacts in an "off" position of the switch arm and engaging said hold contacts in other positions of the switch arm to retain the multivibrator circuit in energized condition after de-actuation of said control.

10. The system claimed in claim 2, wherein the typewriter mechanism includes a spacer key and an associated spacer solenoid energizable to actuate said key, and the stepper switch includes a number of additional switch contacts ahead of the switch contacts connected to said elements, a two-positional switch adapted in one position to connect and in another position to disconnect said additional contacts to and from said spacer solenoid, and means in the calculator mechanism for moving said last-named switch to its one position when the stored multidigit amount is negative and to its other position when the stored amount is positive, whereby to cause positive and negative amounts to be printed in different columns.

11. The system claimed in claim 2, wherein the multivibrator circuit comprises a pair of transistors each having one electrode energizable from a source, a second electrode connected to adjustable biasing means, and a third electrode constituting a respective one of said circuit outputs and cross-coupling means interconnecting the third electrode of each transistor to the second electrode of the other.

12. The system claimed in claim 11, including a potentiometer having its ends connected to the respective second electrodes and its slider connected to a voltage source for varying the relative bias applied to the respective second electrodes thereby to vary the relative durations of said energizing pulses.

References Cited by the Examiner

UNITED STATES PATENTS 2,842,309 7/58 Erbstosser ............ 235—59

LEO SMILOW, *Primary Examiner.*

WALTER W. BURNS, *Examiner.*